United States Patent [19]

Bumgardner

[11] Patent Number: 5,257,324
[45] Date of Patent: Oct. 26, 1993

[54] ZERO-TIME-DELAY VIDEO PROCESSOR CIRCUIT

[75] Inventor: Jon H. Bumgardner, Ridgecrest, Calif.

[73] Assignee: The United States of America as represented by the Secretary of the Navy, Washington, D.C.

[21] Appl. No.: 786,634

[22] Filed: Nov. 1, 1991

[51] Int. Cl.⁵ .......................... G06K 9/36; H04N 7/01
[52] U.S. Cl. ....................................... 382/44; 382/47; 358/160; 358/136
[58] Field of Search ........................... 382/56, 44, 47; 358/160, 445, 136, 137; 364/515, 521

[56] References Cited

U.S. PATENT DOCUMENTS

| H84 | 7/1986 | Bumgardner | 358/160 |
|---|---|---|---|
| 3,976,982 | 8/1976 | Eiselen | 340/172.5 |
| 4,233,636 | 11/1980 | Harbaugh et al. | 358/287 |
| 4,275,450 | 6/1981 | Potter | 364/515 |
| 4,394,693 | 7/1983 | Shirley | 358/298 |
| 4,417,281 | 11/1983 | Hama | 358/287 |
| 4,528,693 | 7/1985 | Pearson et al. | 382/47 |
| 4,661,987 | 4/1987 | Anderson et al. | 382/41 |
| 4,819,190 | 4/1989 | Hinman et al. | 364/521 |
| 4,982,285 | 1/1991 | Sugiyama | 358/136 |

Primary Examiner—Joseph Mancuso
Assistant Examiner—Yon J. Couso
Attorney, Agent, or Firm—Harvey A. Gilbert; Melvin J. Sliwka; John L. Forrest, Jr.

[57] ABSTRACT

A zero-time-delay video processor circuit includes reduction circuitry for receiving a digital image input and providing a reduced and Nyquist acceptable digital image output signal. A controlled write/read memory connected to the reduction circuitry provides the digital image output. A digital estimator is connected to the reduction circuitry for providing an estimated gain signal. A gain corrector circuit is connected to the controlled write/read memory for compensating for errors in the estimated gain. A signal indicative of the true or required gain is provided to the digital estimator and to the gain corrector.

9 Claims, 5 Drawing Sheets

ZERO-TIME-DELAY VIDEO PROCESSOR CIRCUIT

BACKGROUND OF THE INVENTION

1. Field of the Invention

This invention relates generally to digital video processing circuitry and particularly to video processing circuitry for reduction, translation and rotation of video images.

2. Description of the Prior Art

Two previous methods have been used to deal with shortcomings of video processors. One method is to add an artificial system delay during image expansion operation to match the innate video processor delay during image reduction operation. This method gives degraded system performance in the expansion and reduction modes along with simpler simulation implementation. The other method utilizes time variable control equation control parameters in the simulation controller to compensate for the time variant nonlinearities of the specified video processor. This second method gives degraded system performance in the reduction mode only.

There are several issued patents for devices related to video signal processing.

U.S. Pat. No. 3,976,982, which issued on Aug. 24, 1976 to Eiselen is directed to an apparatus for image manipulation capable of blanking an image area, combining two images, changing scale, translation, rotation, and creation of a mirror image. The apparatus uses bit stream processing for manipulating black/white images. The apparatus includes an accumulating memory for storing a base image, and external network of coded sequences, and a network that logically combines the base image with the coded sequences from the external source for manipulating an image or combining it with another image.

U.S. Pat. No. 4,233,636, which issued on Nov. 11, 1980 to Harbaugh et al. is directed to an optical read-write system with an electronically variable image size. A first laser scanner scans an object and generates an electrical signal indicative of the image of the object. The electrical image signal is stored at a read clock frequency, and the stored image signal is retrieved at a write clock frequency. The electrical image signal is then applied at the write clock frequency to a second scanner, which displays an image of the object. The size of the image compared to the object size is determined by the differential of the read clock frequency and the write clock frequency U.S. Pat. No. 4,275,450 which issued on Jun. 23, 1981 to Potter is directed to a video magnification/demagnification apparatus and method that permits selective variation in the size of the output image derived from digital image signals.

U.S. Pat. No. 4,394,693, which issued on Jul. 19, 1983 to Shirley is directed to generating enlarged or reduced video images. Shirley discloses selective reduction or expansion of an image represented by an array of digitally valued picture elements by extracting or inserting spaced apart rows and lines of picture elements at positions that are the closest approximation to the newly scaled size. In enlargement the added lines are duplicative of the next adjacent line. In reduction the lines are deleted, and subsequent lines are shifted to close the gaps to provide a continuous image.

U.S. Pat. No. 4,417,281, which issued on Nov. 22, 1983 to Hama is directed to an image magnification control mechanism for a facsimile zoom lens. Hama discloses a position detecting section that is directly coupled to a drive member for moving the optical system of the zoom lens under the control of a servo mechanism responsive to a a pulse signal from the detecting section.

U.S. Pat. No. 4,528,693, which issued on Jul. 9, 1985 to Pearson et al. is directed to scaling facsimile image data. Pearson et al. discloses converting image data of an image matrix to a new image matrix having a different number of matrix points. Each new image pixel element (pel) has a gray scale determined by considering its position relative to the nearest neighbors of an original image pel. A look up table is addressed according to the gray scale of each neighbor pel and the position of the new pel in its neighborhood. The look up table comprises a memory organized in planes. Each plane corresponds to one of a plurality of gray scale combinations of each neighborhood. The position of each storage cell within a plane represents the position of the new pel relative to the new neighbor. By addressing a plane representing the gray scale levels within a given neighborhood and addressing a position within the represented neighborhood the gray scale of the new pel is determined.

U.S. Pat. No. 4,661,987, which issued on Apr. 28, 1987 to Anderson et al. is directed to a video processor that varies the size of a digitized video image in two video frame times by transforming successive lines of the image along one axis and then transforming successive lines of the image along the other axis.

U.S. Pat. No. 4,819,190which issued on Apr. 4, 1989 to Hinman et al. is directed to a video line processor for varying the size of a video image along a video line by varying the image size first along horizontal lines and then along vertical lines. Intermediate and final frames are stored in memories in which row and column addressing is interchanged on alternate frames.

Of particular relevance is the Statutory Invention Registration (SIR) No. H84 published Jul. 1, 1986 by Bumgardner and entitled "Real Time Polar Controlled Video Processor". This SIR discloses real time reduction, enlargement, translation, and rotation processing but with a one frame specification time delay in the reduction mode. This time delay is a potentially highly detrimental factor when viewed from the perspective of high speed missile tracking and simulation applications which are successfully addressed by the present invention. The present invention is directed to image expansion, one to one processing and image reduction as is the SIR. However, it performs operations which produce the Nyquist data base from each frame of pixels to which estimates of the desired or required gain are applied when gain estimates less than one (1) are necessary to produce the reduced next frame image from the reduced next frame without the expense of that frame time of processing required by the apparatus fo the SIR. In the SIR, as each frame to be subjected to image reduction is received, the operations performed on the received pixels to produce a Nyquist rendition of the reduced image from the lesser number of pixels resulting from the operations takes one frame-time. Thus, the present invention differs from the apparatus of the SIR in that in performing all image processing functions that the SIR does, image reduction by the present invention is performed on a per frame basis in one less frame time even though it too produces a Nyguist rendition reduced image. Further, although the present invention can be used by itself it also may be combined in those systems and devices incorporating the additional functions of direct one to one (1:1) image processing as well as image enlargement.

SUMMARY OF THE INVENTION

A zero-time-delay video processor circuit according to the present invention comprises reduction means for receiving a digital image input and providing a reduced present frame digital image output signal. The reduction means employs Nyquist criteria and estimated gain with gain correction when required gain is less than one and image reduction is chosen. The reduction means also provides for one to one (1:1) and gain greater than one image enlargement signal processing. The controlled write/read memory has a first input connected to the reduction means to receive reduced digital image output signal and provides a digital image output. A digital estimator is connected to the reduction means for providing an estimated gain thereto. A gain corrector circuit is connected to the controlled write/read memory for compensating for errors in the estimated gain. The gain corrector has a first input connected to an output of the digital estimator to receive the estimated gain therefrom. The zero-time-delay video processor circuit further includes means for providing a signal indicative of the true or required gain to the digital estimator and to the gain corrector.

DESCRIPTION OF THE PREFERRED EMBODIMENT

FIGS. 1 through 8 are extracted from U.S. Statutory Invention Registration No. H84 describing Real-Time Polar Controlled Video Processor.

Figure 1:
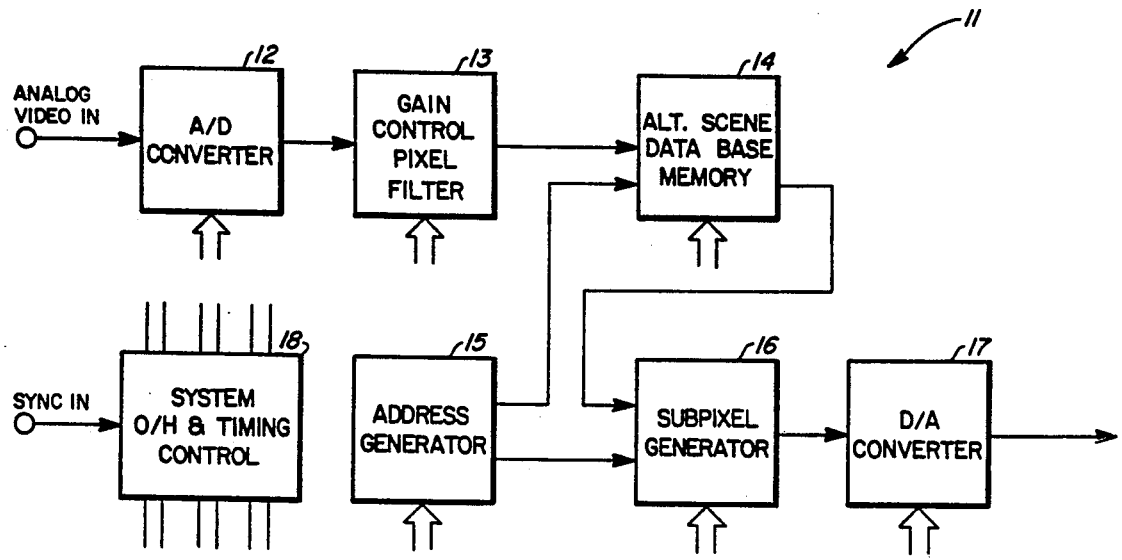
FIG. 1 is a prior art functional block diagram of a real-time polar controlled video processor.

Referring to FIG. 1, an analog-to-digital, AD, converter 12 receives the analog signal from a conventional video detector, not shown, and converts the signal to digital signals to facilitate digital processing by the circuitry of FIGS. 1-8. The conversion is effected at the pixel rate which is controlled by the resolution requirements of the system in the well-understood manner. Although any commercially available circuitry element may be used in accordance with good engineering practice, in an eight-bit developmental model a TDC 1019J unit manufactured by TRW Incorporated of Cleveland, Ohio, was used.

The output from AD converter 12 is fed to a gain controlled pixel filter 13. As the name implies, gain controlled pixel filter 13 passes the digital video signals with either reduction or amplification as required. The ratio of gain/reduction is chosen to satisfy application requirements. Other requirements, affecting gain choices may involve imaging and signal processing considerations such as Nyquist sampling theorem requirements, for example.

The output from gain controlled pixel filter 13 is fed to an alternating scene database memory 14. As the name suggests, two channels of field/frame memory are provided by alternating scene database memory 14. The duality permits a memory to be enabled at all times to receive data. The output of alternating scene database memory 14 is fed to a subpixel generator 16.

Subpixel generator 16 produces a brightness for the subpixel which is an element of the rotated and gain processed image. The relative brightness is a function of the brightness of the adjacent pixel elements of the original scene. The operation of this circuit and the description of its component parts will be more completely described herein.

Alternating scene database memory 14 and subpixel generator 16 each receive inputs from an address generator 15. Address generator provides read and write addresses for the individual pixel elements from a signal received from a system overhead and timing control circuit 18.

The output of the subpixel generator 16 is fed to a conventional video digital-to-analog converter 17 to output the desired video signal. As indicated by the broken arrows in the various figures, all of the aforedescribed circuits receive the necessary timing signals and memory address signals from a system overhead and timing circuit 18. The addresses corresponding to the rotated and gain controlled signals and necessary synchronously generated timing pulses are provided by this software-controlled circuit. In the eight-bit developmental model this function was performed by a microprocessor circuit based on a conventional 68000 microprocessor circuit. Other conventional microprocessor arrangements could be used as well with suitable engineering trade-offs. The circuit solves the trigonometric relationships of the output pixel addresses caused by a selected gain, amount of rotation, and center of rotation of an input pixel. The exact circuitry and accompanying software, which form no part of this subject invention are left to such engineering skill and will not be described further.

Figure 2:
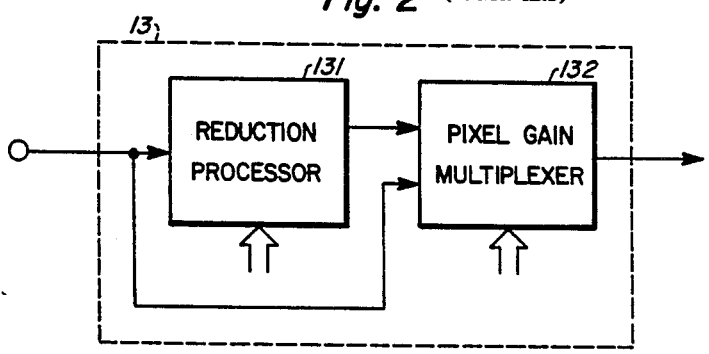
FIG. 2 is a prior art detailed block diagram of a gain controlled pixel filter of FIG. 1.

Referring to FIG. 2, gain-controlled pixel filter 13 receives the output of AD converter 12 and may comprise multiplexers 132 such as Fairchild 74F157 in the pixel gain multiplexers 13 of FIG. 2. The reduction processor 131 consists of multipliers, summers and accumulators (MPY-8HUJ, 74F283, 74F374, respectively, as example ICs). The gain-controlled pixel filter 13 may pass pixels straight through unaltered for unity gain or may combine and average pixels for sub-unity gain as required for Nyquist sampling theorem requirements. As previously noted, filter 13 works in a coordinated manner with address generator 15.

Figure 3:
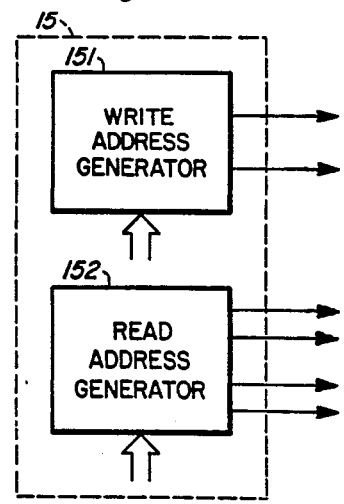
FIG. 3 is a prior art detailed block diagram of the address generator of in FIG. 1.

The address generator 15, FIG. 3, comprises a write address generator 151 and a read address generator 152. These elements cooperate in the conventional manner to originate the location into which incoming pixel information from the gain-controlled pixel filter 13 is stored, and the location from which data to the memory output multiplexer 145, to be described, is originated. The primary components of the address generator 15 are registers and summers such as 74F374 and 74F283.

The write address generator 151 is a component part of gain-controlled pixel filter 15 and "steers" the incoming pixel to the proper location in memories within alternating scan database memory 14. When in the reduction mode, write address generator 151 does not necessarily produce a unique pixel address for each new system pixel period time, because gain-controlled pixel filter 15 is averaging and combining individual input pixels. If desired, write address generator 151 may be integrated into the reduction processor 131 of FIG. 2 and the alternating scene database memory 14 for hardware part count minimization, but is shown separate for purposes of clarity. Unity gain with no rotation causes a one for one incoming pixel-to-write-address correlation.

The details of read address generator 152 will be described in greater detail in conjunction with subsequent figures.

Figure 6:
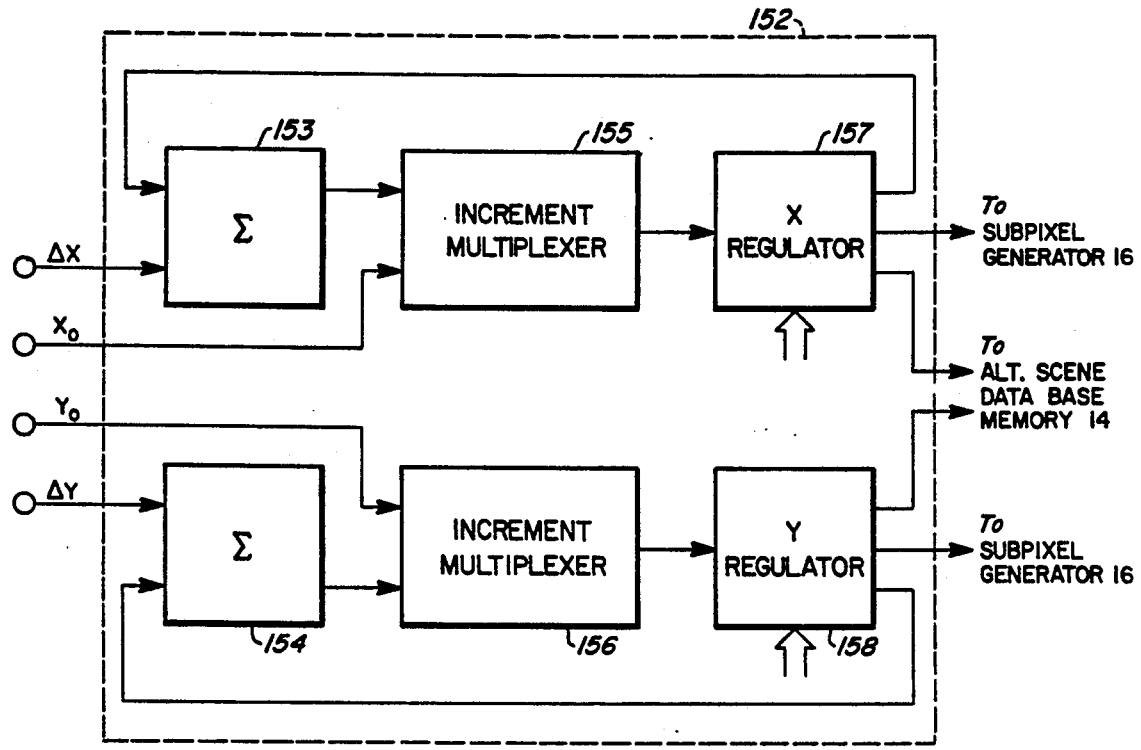
FIG. 6 is a prior art schematic of the read address generator of FIG. 3.

Referring to FIG. 6, the circuit components of alternating scene database memory 14 are illustrated. Field/frame address multiplexers 141 and 142 receive output signals from write address generator 151 and read address generator 152 of gain control pixel filter 15. The read and write address output of field/frame address multiplex circuit is fed to a field/frame memory 143. Similarly, a field/frame memory 144 receives outputs from gain control pixel filter 13. The outputs from field memories 143 and 144 are fed to a memory output multiplexer circuit 145. Please note a normal feature of memories 143 and 144 is output of a normal scene database intensity value when the subpixel comes from valid source scene area, or output of a substitute fixed marker intensity value when addressing beyond-scene-border subpixel locations. As previously noted, all three multiplexer circuits 141, 142, and 145 together with the two field/frame memories 143 and 144 receive clocking signals from system overhead and timing controller 18. The clocking signals ensure alternate operation so as to ensure each address will be stored and properly outputted.

Figure 5:
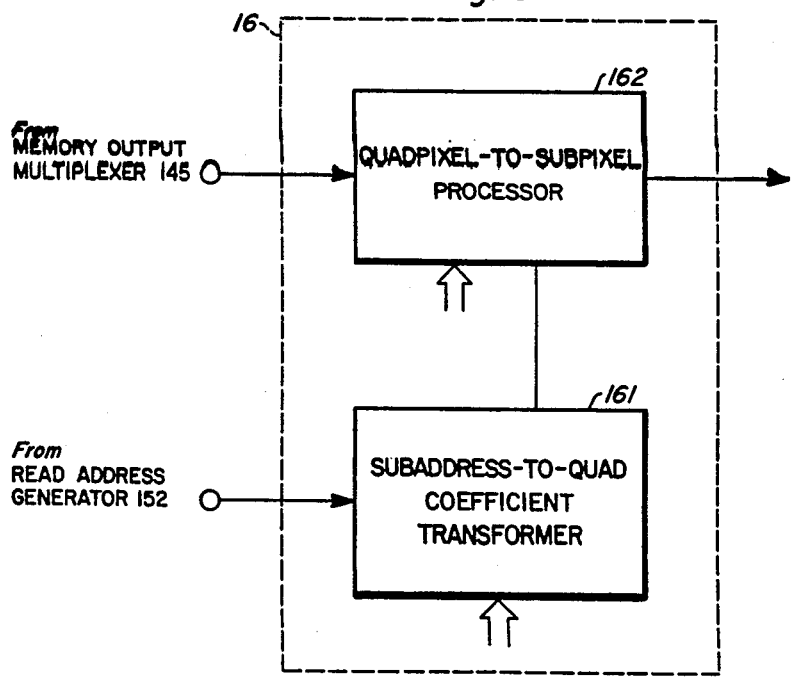
FIG. 5 is a prior art detailed block diagram of the subpixel generator of FIG. 1.

FIG. 5 shows that subpixel generator 16 includes a quadpixel to subpixel processor 162 and a subaddress to quad coefficient transformer 161. The component parts and operation of these circuits will be described in greater particularity herein.

FIG. 6 illustrates the component circuits which together comprise the read address generator illustrated in FIG. 3. Two summers 153 and 154 receive X and Y address signals, respectively, from the system overhead and timing control 18. The outputs of summers 153 and 154 are fed to increment multiplexer circuits 155 and 156 which, in turn, output signals to registers 157 and 158. Increment multiplexers 155 and 156 also receive $X_o$ and $Y_o$ address signals from system overhead and timing circuitry 18. Outputs from registers 157 and 158 are fed back to summers 153 and 154 to be summed with the DX and DY signals. Observe that DX and DY are signed binary numbers allowing both positive and negative position updating. The outputs from registers 157 and 158 are fed to subpixel generator circuit 16 and to alternating scene database memory 14, as illustrated.

Figure 7:
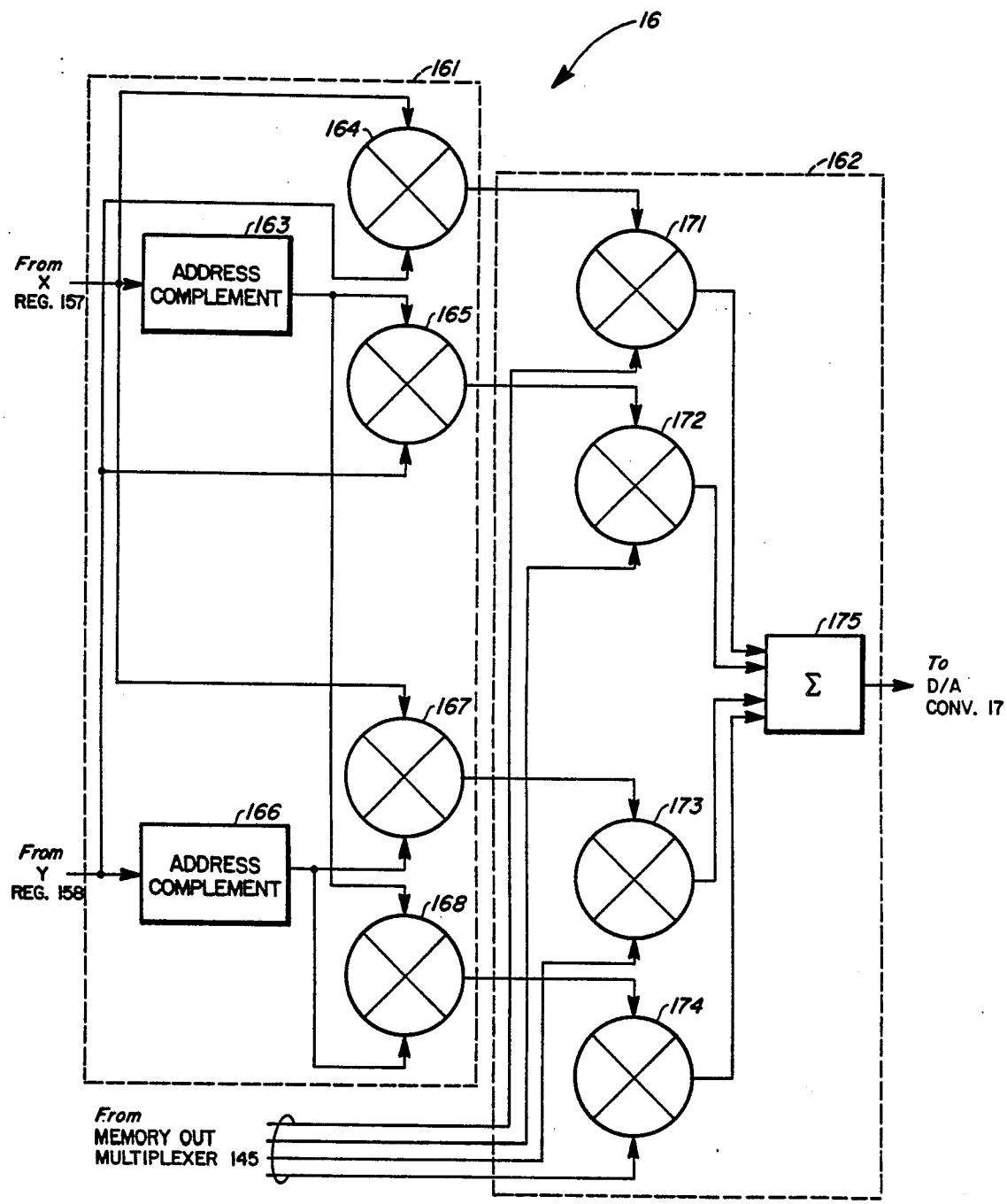
FIG. 7 is a prior art schematic of the subaddress-to-quad-coefficient transformer, and the quad pixel-to-subpixel processor of FIG. 5.

FIG. 7 shows the circuitry comprising subpixel generator 16 in greater detail than illustrated in FIG. 5. Signals from X and Y registers 157 and 158 are fed to address complement circuits 163 and 166 and to a first set of multipliers 164, 165, 167, and 168 in the manner illustrated. The outputs from first set of multipliers are fed to a second set of multipliers 171–174. The output of memory output multiplexers 145 is also connected to supply inputs for the second set of multipliers. Summing circuit 175 outputs the subpixel set needed to create the video presentation which is fed to digital-to-analog converter 17 to produce the composite video.

The combined circuitry is capable of processing video input signals to permit scene rotation and magnification/reduction in what is essentially real-time. That is, although the circuitry has some finite processing time, the processing time is very small in comparison to the frame rate such that a real-time readout of video input is very closely approximated.

The operation and further construction details will be described in connection with the various previously described figures and FIG. 8, yet to be discussed.

The read address generator 152, shown in FIGS. 3 and 6, is the key to the polar controlled capability of the system of the apparatus of FIGS. 1-8, as well as real-time operation. The read address generator 152 generates successive location parameters (X and Y) which overlay the image laid down in the memories 143 and 144. Each successive output pixel from the entire system has a unique X,Y coordinate pair generated by read address generator 152.

The relative geometric spacing is provided by gain, rotation, and offset commands given to the system from external application requirements, i.e., one set of parameters q, G, X and Y, which designate angle of rotation, gain or image size factor, and image translation, will generate a series of subpixel addresses in memory space. The DX and DY values dictated by q, G, X and Y alter the X and Y output of read address generator 152 in real-time with each successive output pixel requirement. The generated address from read address generator 152 has both an integer pixel portion and a subpixel (i.e., fractional pixel) portion.

Referring to FIGS. 6 and 7, the position of the original pixel is designated as $X_o$ and $Y_o$. The data designating $X_o$ and $Y_o$ are fed to increment multiplexers 155 and 156, respectively. The DX and DY, the subpixel interspacings values are fed into summers 153 and 154 respectively, shown in FIG. 6, which in turn increment outputs of multiplexers 155 and 156. The multiplexer outputs are fed into the appropriate X and Y registers, 157 and 158. X and Y registers 157 and 158 are incremented by DX and DY for each pixel by a signal from the system overhead and timing controller 18.

The values for $X_o$, $Y_o$, DX and DY are also obtained from controller 18.

Figure 4:
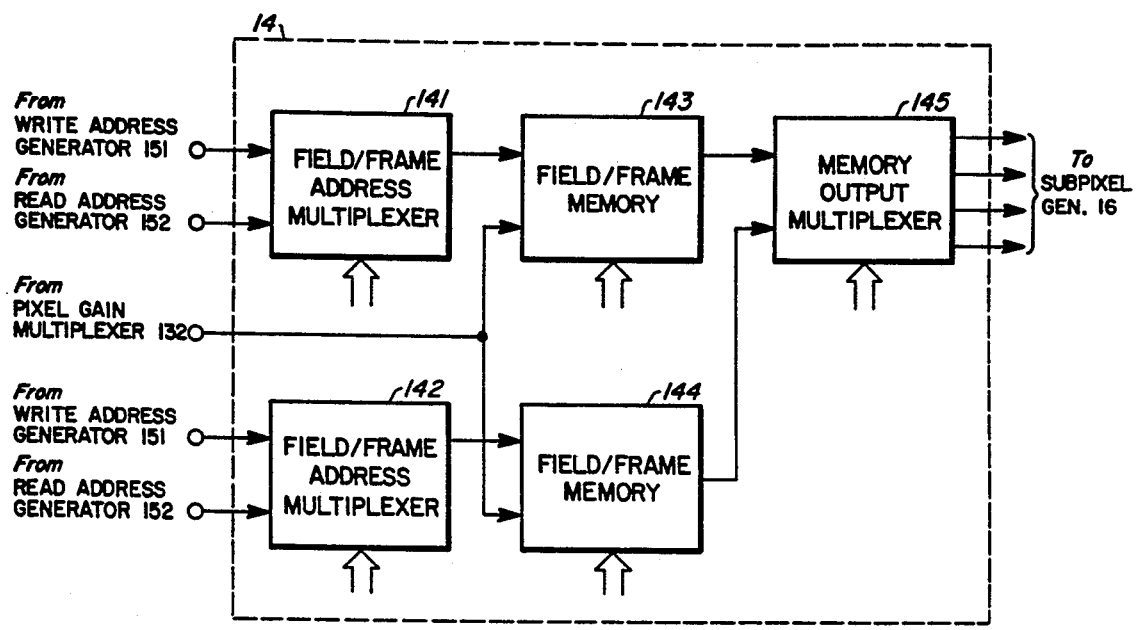
FIG. 4 is a prior art detailed block diagram of the alternating scene database memory of FIG. 1.

As shown in FIG. 7, the outputs of registers 157 and 158 are fed to the field/frame address multiplexers 141 and 142 shown in FIG. 4 and to the subaddress to quad coefficient transformer 161, a component circuit of subpixel generator 16 and illustrated in FIGS. 5 and 7.

As shown in FIG. 7, the signal from register 157 to transformer 161 goes to multiplexers 164 and 167, and to address complementer (256-xLsp) 163. The output from address complementer 163 goes to multipliers 165 and 168. Similarly, the signal from register 158 goes to multipliers 164 and 165, and to address complementer (256-xLsp) 166. The output from address complementer 166 is fed to multipliers 167 and 168.

Essentially transformer 161 makes a two to four conversion of the output signals from read address generator 152, a component circuit of address generator 157, to quadpixel to subpixel processor 162.

FIG. 7 shows the four outputs from multipliers 164, 165, 167, and 168, are fed to multipliers 171-174 respectively. Data from the memory output multiplexer 145 of FIG. 4 is also fed into multipliers 171-174 respectively, resulting in four products which are summed in summer 175 thus providing a subpixel output of the proper brightness based on the respective brightnesses of the four closest pixels of the original input image.

Figure 8:
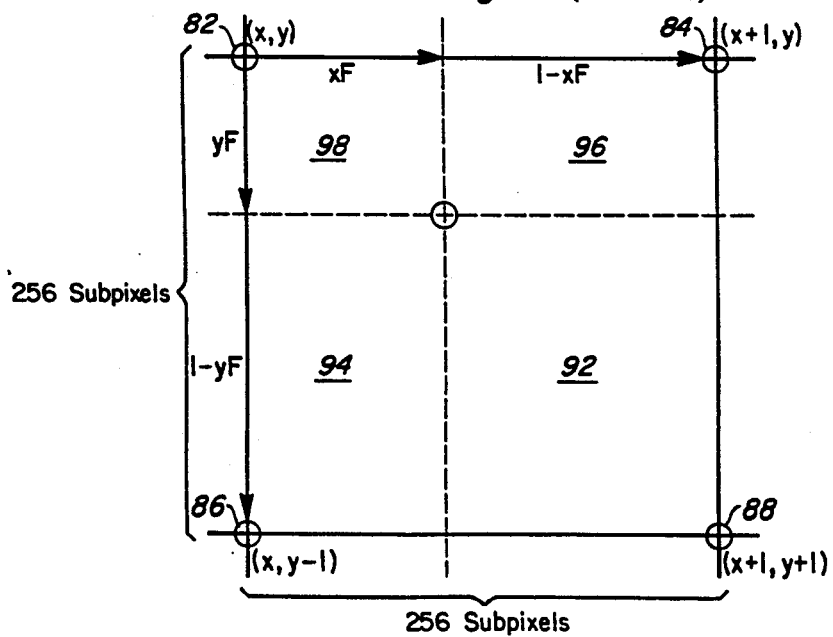
FIG. 8 is a prior art diagram of typical locations of pixels and a subpixel as processed within the video processor of FIG. 1.

In FIG. 8, a diagram illustrates how the brightnesses of four original pixels 82, 84, 86 and 88, are incorporated to determine the brightness of a new subpixel 90. the contribution of the brightness of each original scene pixel, 82, 84, 86 or 88, to determine subpixel 90 brightness is analogous to an area-related function. The area associated with an opposite pixel determines a respective pixel's contribution of brightness to the subpixel 90. For example, the amount of contribution of brightness of pixel 82 is determined by area 92, of pixel 84 by area 94, of pixel 88 by area 98, and of pixel 86 by area 96. The four pixel brightnesses are averaged according to contribution determined by area. The following formula applies if 82, 84, 86 and 88 represent the magnitudes of brightnesses of the corresponding pixels as noted in FIG. 4:

The numerator products are performed by multipliers 171-174 and the numerator sums by summer 175. The sum of the area 92, 94, 96 and 98, which is the denominator is a constant determined by the pixel parameters used in the system.

The alternating scene database memory 14, in FIGS. 1 and 4, consists of field/frame address multiplexers 141 and 142, field/frame memories 143 and 144, and a memory output multiplexer 145, as previously described. The alternating action permits one memory to record an incoming image during the time interval the other memory provides a previous-image-total-data to the output circuitry, including memory output multiplexer 145. At the completion of each frame or field, depending upon the chosen form of image processing, the memory roles of writing and reading are reversed.

Between the address generators 151 and 152 and the field/frame memories 143 and 144, field/frame address multiplexers 141 and 142 are located. Multiplexers 141 and 142 are preferably of an integrated circuit type 74F157, although other commercially available circuits may be used. The multiplexers 141 and 142 allow each memory address to be controlled by the proper read or write address. Even though shown as distinct entities, it should be understood that, an alternate implementation may involve integration of the address generators 151 and 152 into the memories 143 and 144 resulting in a multiplex mode of the generators 151 and 152 rather than the multiplex choice of the generators. Obviously, such integration is a way of maximizing speed performance and minimizing parts count.

The field/frame memories 143 and 144 may be static memories such as 16KX1 IMS 1400 INMOS integrated circuits. Or by using "smart memory techniques," devices such as 16KX4 IMS 2620 dynamic random access memoroes (RAMs) can be used to reduce parts count and cost. The purpose of memories 143 and 144 is merely to be able to sequentially write single pixels, and to read four mutually adjacent pixels at a time (2×2 spacing) under the direction of the write address generator 151. The integer portion of the X,Y coordinates determines the first point with the other three required points being: (X+1,Y); (X,Y+1); and (X+1,Y+1), see FIG. 8. These four points are passed on to the memory output multiplexer 145. The X,Y value comes from the read address generator 152 via field/frame address multiplexers 141 and 142.

The memory output multiplexer 145 may be composed of 74F157 multiplexer integrated circuits. The memory output multiplexer 145 chooses which memory output data will be used by the subpixel generator 16. Subpixel generator 16 is the actual generator of subpixel values and uses the four X,Y pixel values supplied by the memory output multiplexer 145, a component circuit of alternating scene database memory 14. Proper weighting is determined by the read address generator 152 into fractional X,Y read coordinates, i.e., the fractional portion of the subpixel address X,Y value.

The subaddress to quad coefficient transformer 161 takes the two address fractional values and converts these into four products by using the $X_F Y_F$, $X_F(1-Y_F)$, $(1-X_F)Y_F$, and $(1-X_F)(1-Y_F)$ products, see FIG. 8. The components of transformer 162 are primarily MPY-8HUJ type multipliers.

The quadpixel to subpixel processor 162 properly matches each of the four coefficients from the subaddress to quad coefficient transformer 161 with four corresponding pixels from the memory output multiplexer 145 and performs a merge operation to form the designated subpixel numeric, or brightness, value. Within the quadpixel to subpixel processor 162 are four multipliers 171-174 and one summer 175. The multipliers 171-174 form four products as explained above. MPY-8HUJ type integrated circuits manufactured by TRW have been used as the multipliers in development models of the apparatus. Summer 175 may be composed of 74F283 type adders. The summer 175 adds each of the four subpixel subcomponents to provide the total subpixel value. The resolution should be at least two bits greater than each multiplier input resolution, either 171, 172, 173, or 174, of the quadpixel to subpixel processor 162 input word, i.e., ten bits minimum if the inputs of processor 162 are eight-bit coefficients and eight-but pixel values as in the development models of the apparatus.

The digital-to-analog converter 17 is chosen to be capable of the full required system pixel rate. The same rate is required for the analog-to-digital converter 12. Converter 17 may encompass a TDC 1016J-8 type device by TRW.

The system overhead and timing controller 18, not a part of the signal processing circuitry of the invention, comprises several integrated circuits, particularly an MC68000 Motorola microprocessor and conventional supporting hardware. The purpose of controller 18 is to convert externally supplied q, G, X, and Y values to internal DX, DY, $X_o$ and $Y_o$ control values for address generators 151 and 152, allowing rotation about any arbitrary point and accuracy and translation by any arbitrary magnitude and direction, and gain change by any arbitrary factor and accuracy, and to provide total system synchronization with external blanking and so forth. Such functions are conventionally generated by established functions. Controller 18 also supplies multiplexer state control, as well as "overseeing" of various pipelining controls which optimize system component count and versatility.

The following gives a practical way of providing reduction of electronic images while allowing the actual gain specification to be made just prior to image exit from the system, field by field, or frame by frame depending upon whether field processing or frame processing is employed.

Figure 9:
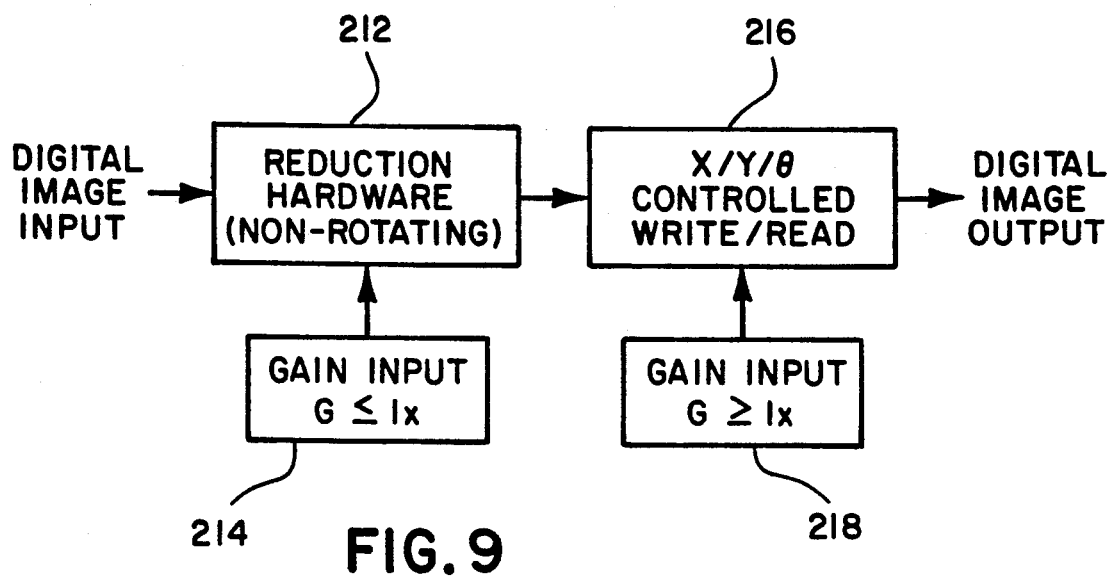
FIG. 9 illustrates a prior art technique for reducing the size of a video image.

Referring to FIG. 9, a prior art system for reducing a video image includes a digital image input that supplies a digital image signal to reduction circuitry 212. The reduction circuitry receives a gain input signal from a gain control circuit 214. The output of the non-rotating reduction circuitry 212 is input to an X/Y/$\theta$ controlled write/read circuit 216, which also receives a gain input signal from a gain control circuit 218. The X/Y/$\theta$ controlled write/read apparatus then outputs a signal indicative of the digital image.

The reduction procedure requires the gain to be specified as the field or frame is being read in. This is because potentially large numbers of source pixels must be summed, weighted, and distributed sequentially as the pixels come in. Specifically, the one field/frame, database load time is used to perform the pixel merging operations which produce the Nyquist acceptable data base of processed pixels for forming the Nyquist rendition reduced image from the input full-size image pixel equivalent database or matrix. The pixel merging methodology for producing the Nyquist database of pixels from which the reduced image is produced is presented in SIR No. H84.

Figure 10:
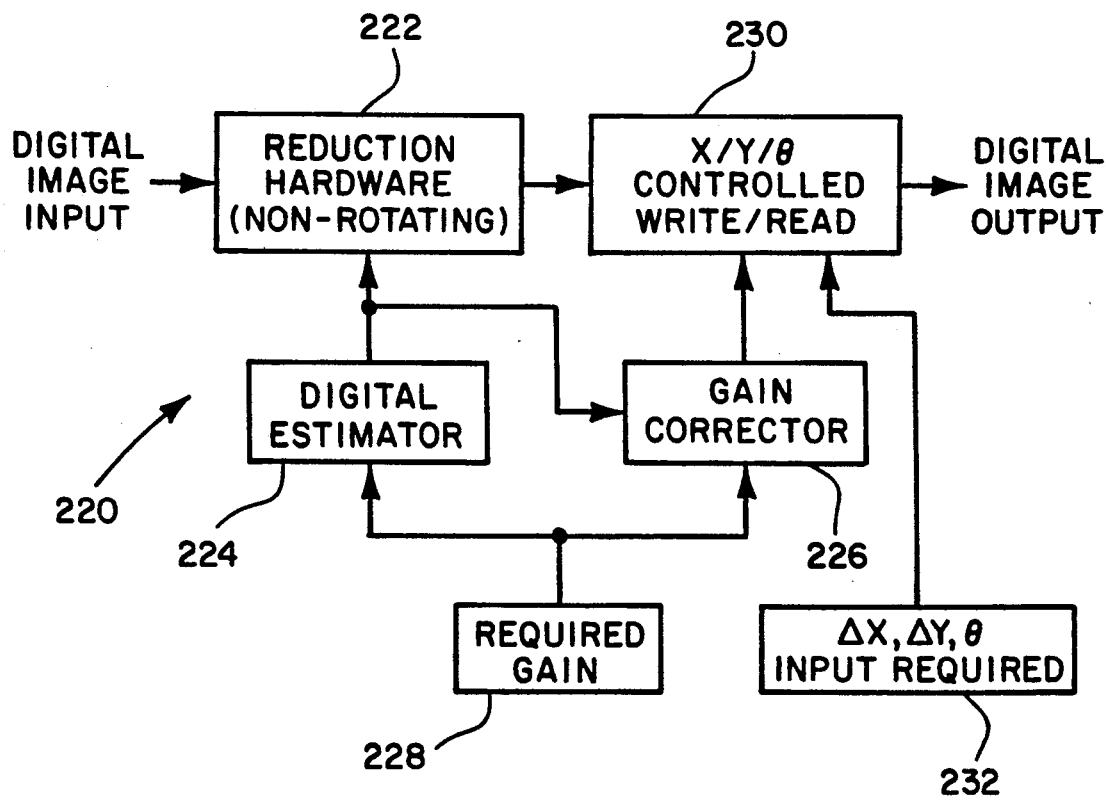
FIG. 10 illustrates a circuit according to the present invention for providing zero time delay reduction of electronic video images.

FIG. 10 illustrates a video processor 220 according to the present invention. The digital image is input to reduction hardware 222 that provides its output to an X/Y/$\theta$/G controlled write/read memory 230. A required gain circuit 228 provides a signal in response to the last minute gain required for the desired image to a digital estimator 224. The digital estimator 224 estimates the next field/frame gain requirement. The performance specifications and level of sophistication of the estimator are best chosen after examining the dynamics of the expected incoming gain signal and the required system error bound limits. Where simple and well behaved gain(T) with low high order derivative coefficient component values exist, very simple and inexpensive estimator circuitry would be adequate. Where more complex gain(T) waveforms are expected and where very tight error spatial filtering error bounds are required, more expensive highly complex estimators of perhaps even an adaptive nature would be most appropriate. The required gain signal 228 is also input to a gain corrector 226. The gain corrector 226 also receives a signal output from the digital estimator 224. The gain corrector 226 compensates for the error/difference in the estimator and provides a gain correction signal to the X/Y/$\theta$/G controlled write/read memory 230. Memory 230 is thus designed to operate over read gains above and below unity. The X/Y/$\theta$/G controlled write/read memory 230 also receives signals indicative of $\Delta x$, $\Delta y$ and $\theta$ inputs from input required 232.

The present invention is an implementation of a last minute gain update for reduction operation. The digital estimator 224 makes it possible to implement the concept of last minute gain correction. Gain signals from the required gain circuit 228 are fed to the reduction hardware 222 via the digital estimator 224 as if no processing delay were present in either the reduction or the expansion mode. Gain signals from the required gain circuit 228 are also applied to the gain corrector 226 which provides a per frame gain correction signal to the read portion of the controlled write/read memory 230.

The output of the estimator 224 is used to control the reduction hardware 22 continuously to provide a Nyquist filtered database frame-by-frame of input scene information. When the actual real-time externally applied gain command from the required gain input 228 causes the estimator 224 to supply any particular field/frame with a reduction gain factor, the reduction hardware 222 causes the currently incoming scene information to be compressed into fewer (Nyguist filtered) pixels as it is stored in the current incoming scene database. Whenever the estimator 224 would provide a scene estimated gain of unity or greater, the estimator output is always limited (clamped) to a maximum value of unity gain, and thus the incoming pixels are stored directly (1:1) into that same current incoming scene database.

Two hardware memory means exist for storing this database of scene information. One is used in the write-mode for storing incoming pixels (whether Nyquist filtered or not), while the other is simultaneously used in the read-mode to supply the subpixel generator within the X/Y/$\theta$/G controlled write/read 230, with data for producing the digital image output. These memory means alternate write/read use with each new scene field/frame time. It should be understood that where reduction is being performed and the nearest neighbor or other reduction methodology is being used for creating the filtered pixels for the reduced image, a Nyquist determined number of filtered pixels is required to assure that an acceptable reduced rendition of the input image is produced and stored. The expansion hardware gain control signal from gain corrector 226 is set to compensate for the error/difference in estimated-to-actual system gain. That is, previously estimated system gain errors or differences are completely eliminated by using the gain correction signal from gain corrector 226 and are replaced by arbitrarily small system tolerant Nyquist inaccuracies. Due to the gain clamped output of the estimator 224, this methodology allows automatic system tracking of any complex excursions of gain as it may pass above and below the unity gain value.

In the prior art device the first frame Nyquist rendered reduced image data base is created and stored in memory. At the time the second frame of Nyquist rendered reduced image data is being stored, the data for the first reduced image is simultaneously being read from memory and communicated to an output device such as a CRT.

With the present invention, when the first frame Nyquist rendered reduced image data is stored it is simultaneously subjected to estimated gain initiated by the required gain for that frame. As this frame is stored the previously stored data is read from alternate memory and subjected to gain compensation by gain corrector 226 to compensate for estimated gain errors/differences. Thus, the estimator 224 makes possible the zero-time-delay result of the present invention.

Thus the apparatus and method of the present invention for estimating the reduced image and Nyquist acceptable pixel data base content for the next frame simultaneously with the development of the output frame pixel data base by the X/Y/$\theta$/G controlled hardware 230 eliminates the one frame time of delay that occurs in creating a reduced image due to the massive amount of operational calculations required to produce the subpixels for the reduced image.

The structures and methods disclosed herein illustrate the principles of the present invention. The invention may be embodied in other specific forms without departing from its spirit or essential characteristics. The described embodiments are to to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A zero-time-delay video processor circuit, comprising:
   reduction means for receiving a digital image input and simultaneously providing a reduced present frame digital image output signal and a next frame reduced digital image output signal;
   a controlled write/read memory for providing a digital image output, the controlled write/read memory having a first input connected to the reduction means to receive presented next frame reduced digital image output signals;
   a digital estimator connected to the reduction means for providing a next frame estimated gain that is clamped to have a maximum value of unity;
   a gain corrector circuit connected to the controlled write/read memory for compensating for errors/differences in the estimated gain, the gain corrector having a first input connected to an output of the digital estimator to receive the estimated gain therefrom; and
   means for providing a signal indicative of the required gain to the digital estimator and to the gain corrector.

2. The zero-time-delay video processor circuit of claim 1 wherein said reduction means produces a Nyquist data base of filtered pixels from the pixels of each unreduced frame image to create each next frame reduced image.

3. The zero-time-delay-video processor circuit of claim 2 wherein said next frame Nyquist filtered pixel data base is produced using a nearest neighbors computational process.

4. A method for forming a zero-time-delay video processor circuit, comprising the steps of:
   providing a reduction apparatus for receiving a digital image input and providing a reduced digital image output signal;
   connecting a controlled write/read memory to the reduction apparatus for providing a digital image output, the controlled write/read memory having a first input connected to the reduction means to receive reduced digital image output signal;
   connecting a digital estimator to the reduction apparatus for providing an estimated gain thereto;
   connecting a gain corrector circuit to the controlled write/read memory for compensating for errors in the estimated gain, the gain corrector having a first input connected to an output of the digital estimator to receive the estimated gain therefrom; and
   providing a signal indicative of the true gain requirements to the digital estimator and to the gain corrector.

5. The method of claim 4 for forming a zero-time-delay video processor circuit wherein said reduction apparatus produces a Nyquist data base of subpixels from the pixels of each unreduced frame image to create each next frame reduced image.

6. The method of claim 4 for forming a zero-time-delay video processor circuit wherein said reduction apparatus produces a Nyquist subpixel database using the nearest neighbors computational process.

7. A method for producing a reduced image by zero-time delay video processing comprising the steps of:
   providing a field or frame input digital image;
   providing a required gain for each next field/frame;
   reducing the present field/frame input digital image;
   producing a present field/frame reduced image data base and an estimated next frame reduced image data base simultaneously with the step of reducing the present field/frame input digital image;
   storing said present field/frame reduced image data base and said estimated next frame reduced image data base;
   correcting the error introduced in the production of said estimated next frame reduced image data base by compensating for the difference between the estimated gain and the required gain applied to the subpixels of the data base; and
   producing a digital image output representing a reduced digital image of the input digital image.

8. The method of claim 7 wherein said reduction is accomplished by creating a subpixel database representing the reduced image from the field/frame digital input by application of nearest neighbor computational processing.

9. The method of claim 8 wherein said nearest neighbor processing is performed to produce a Nyquist subpixel database.

* * * * *